United States Patent Office 2,794,018
Patented May 28, 1957

2,794,018
NEW QUINAZOLINE DERIVATIVES

Alfred Spinks and Edwin Harry Paterson Young, Blackley, Manchester, England, assignors to Imperial Chemical Industries Limited, a corporation of Great Britain No Drawing. Application August 3, 1954,
Serial No. 447,654

Claims priority, application Great Britain August 7, 1953

11 Claims. (Cl. 260—256.4)

This invention relates to new quinazoline derivatives and more particularly it relates to new quinazoline derivatives which possess diuretic properties.

According to our invention we provide the said new quinazoline derivatives which are compounds of the formula:

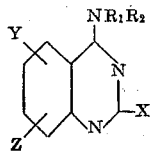

wherein $R_1$ stands for hydrogen or for a lower alkyl radical, $R_2$ stands for hydrogen or for a lower alkyl radical, X stands for hydrogen or for a lower alkyl radical, Y stands for hydrogen, halogen or for a lower alkyl radical and wherein Z stands for the group $NHR_3$ wherein $R_3$ stands for hydrogen or for an acyl radical and is located at position 7 or 8 of the quinazoline ring system.

Substances of this formula, for example 4,6- and 4,8-diaminoquinazolines, have been found to possess powerful diuretic properties in combination with very low toxicity.

As new quinazoline derivatives there may be mentioned for example:

4,7-diaminoquinazoline.
4-amino-7-acetamidoquinazoline.
4-methylamino-7-aminoquinazoline.
4-dimethylamino-7-aminoquinazoline.
4-ethylamino-7-aminoquinazoline.
4-iso-propylamino-7-aminoquinazoline.
4-n-butylamino-7-aminoquinazoline.
4-n-butylamino-7-acetamidoquinazoline.
4,8-diaminoquinazoline.
4,8-diamino-6-chloroquinazoline.
4,7-diamino-2-methylquinazoline.
4,7-diamino-6-methylquinazoline.
4-amino-7-butyramidoquinazoline.

The numbering of the quinazoline ring system is that given in "The Ring Index" by Patterson and Capell and published by the Reinhold Publishing Corporation of New York, U. S. A.

According to a further feature of the invention we provide a process for the manufacture of the said new quinazoline derivatives which comprises reduction of compounds of the formula:

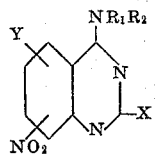

wherein $R_1$, $R_2$, X and Y have the meaning stated above and wherein the nitro group is located at position 7 or 8 of the quinazoline ring system, the reduction product being subsequently acylated if necessary.

The process of reduction may be carried out by the use of reducing agents for example stannous chloride or of metallic powders for example iron powder in an aqueous acid medium for example aqueous hydrochloric acid.

As stated above, the reduction product may subsequently be acylated if necessary and such acylation procedures may be any of those known to the art. There may be used for example a mixture of a suitable acid and its anhydride for example a mixture of acetic acid and acetic anhydride.

The invention is illustrated but not limited by the following examples in which the parts are by weight:

Example 1

A stirred mixture of 20 parts of iron powder, 10 parts of concentrated aqueous hydrochloric acid and 500 parts of water is heated at 95° C. for 15 minutes. There are then added 19 parts of 4-amino-7-nitroquinazoline and the mixture is stirred and kept at 95° C. during 5 hours. It is then treated with sodium carbonate until alkaline to Brilliant Yellow and filtered while hot. The solid residue is washed with 100 parts of hot water. The filtrate and washings are combined, cooled and filtered and the solid residue is crystallised from water. 4,7-diaminoquinazoline is obtained as colourless needles of M. P. 253–254° C.

Example 2

2.6 parts of acetic anhydride are added to a solution of 4 parts of 4,7-diaminoquinazoline (obtained as described in Example 1) in 26 parts of glacial acetic and the mixture is heated to 100° C. during 10 minutes and then cooled to 20° C. and added to 250 parts of water and 100 parts of ice. The mixture is filtered and the filtrate is made alkaline to Brilliant Yellow by the addition of concentrated aqueous ammonium hydroxide. The mixture is filtered and the solid residue is crystallised from water and gives 7-acetamido-4-aminoquinazoline, as a colourless crystalline solid, M. P. 349–350° C. (decomposition).

Example 3

A mixture of 5 parts of iron powder, 2 parts of concentrated aqueous hydrochloric acid and 200 parts of water is stirred and heated at 95–100° C. during 15 minutes. 5 parts of 4-methylamino-7-nitroquinazoline are added to the mixture which is then stirred at 95–100° C. during 6 hours. It is then filtered and the filtrate is made alkaline to Brilliant Yellow by addition of sodium carbonate and is then filtered. To the filtrate are added 72 parts of 40% aqueous sodium hydroxide and the mixture is filtered. The solid residue is crystallised from water and 7-amino 4-methylaminoquinazoline is obtained as a pale cream crystalline solid, M. P. 221° C.

The 4-methylamino-7-nitroquinazoline used as starting material may be obtained by adding 20 parts of 4-chloro-7-nitroquinazoline during 30 minutes to a stirred solution of 200 parts of 23% aqueous methylamine at 45–50° C. The mixture is then stirred during a further 15 minutes at 45–50° C. and is then cooled and filtered. The solid residue is washed with two portions each of 50 parts of water and is then crystallised from water. 4-methylamino-7-nitroquinazoline is obtained as yellow needles, M. P. 245–246° C.

Example 4

A mixture of 10 parts of iron powder, 5 parts of concentrated aqueous hydrochloric acid and 100 parts of water is heated and stirred at 95–100° C. during 15 minutes. 6 parts of 4-dimethylamino-7-nitroquinazoline are then added and the mixture is stirred and heated at 95–100° C. during 6 hours. The mixture is filtered and the filtrate is adjusted to pH 8 by the addition of sodium carbonate and is then boiled and filtered hot. The filtrate is cooled and allowed to stand and is then filtered. The solid residue is crystallised from water and 7-amino-4-dimethylaminoquinazoline is obtained as colourless needles, M. P. 89–91° C.

The 4-dimethylamino-7-nitroquinazoline used as starting material may be obtained by adding 20 parts of 4-chloro-7-nitroquinazoline to a stirred solution of 200 parts of 24% aqueous dimethylamine at 45–50° C. The mixture is then heated to 70° C. during 10 minutes, and is then allowed to cool to 20° C. and thereafter to stand for 16 hours. The mixture is filtered and the solid residue is washed with cold water and crystallised from 150 parts of ethanol. 4-dimethylamino-7-nitroquinazoline is obtained as yellow crystals, M. P. 171–173° C.

*Example 5*

A mixture of 10 parts of iron powder, 5 parts of concentrated aqueous hydrochloric acid and 100 parts of water is heated and stirred at 95–100° C. for 10 minutes. 5.3 parts of 4-ethylamino-7-nitroquinazoline are then added and the mixture is heated and stirred at 95–100° C. during 5 hours. The mixture is made alkaline to Brilliant Yellow by the addition of sodium carbonate and is then filtered and the solid residue is washed with 20 parts of hot water. The combined filtrate and washing is cooled and filtered and the solid residue is crystallised from water. 7-amino-4-ethylaminoquinazoline is obtained in a hydrated form as colourless needles, M. P. 99–100° C.

The 4-ethylamino-7-nitroquinazoline used as starting material may be obtained by quickly adding 20 parts of 4-chloro-7-nitroquinazoline to a stirred solution of 80 parts of 24% aqueous ethylamine at 20° C. The mixture is then kept at 60–70° C. during 15 minutes and is then cooled to 20° C. The mixture is diluted with 200 parts of water and filtered and the solid residue is washed with cold water and crystallised from 70 parts of ethanol. 4-ethylamino-7-nitroquinazoline is obtained as a yellow crystalline solid, M. P. 195–197° C.

*Example 6*

A mixture of 10 parts of iron powder, 10 parts of concentrated aqueous hydrochloric acid and 100 parts of water is heated and stirred at 95–100° C. until no longer acid to Congo red. 8 parts of 4-iso-propylamino-7-nitroquinazoline are then added and the mixture is heated at 95–100° C. with stirring during 6 hours. It is then made alkaline to Brilliant Yellow by the addition of sodium carbonate and filtered. The solid residue is washed with 20 parts of hot water, and the combined filtrate and washing is then basified with 25 parts of 40% aqueous sodium hydroxide solution and the mixture so obtained is extracted with 210 parts of ether. The ethereal extract is dried and then saturated with dry hydrochloric acid gas and filtered. The solid residue is dissolved in 24 parts of methanol and precipitated by the addition of 135 parts of ethyl acetate. 7-amino-4-iso-propylaminoquinazoline dihydrochloride is obtained as a colourless crystalline solid, M. P. 239–240° C.

The 4-iso-propylamino-7-nitroquinazoline used as starting material may be prepared by adding 20 parts of 4-chloro-7-nitroquinazoline to 35 parts of iso-propylamino at 20° C. with stirring. The mixture is allowed to stand for 1 hour and it is then diluted with 500 parts of cold water and filtered. The solid residue is washed with cold water, and is then crystallised from 200 parts of 50% aqueous ethanol. 4-iso-propylamino-7-nitroquinazoline is obtained as a yellow crystalline solid, M. P. 161–163° C.

*Example 7*

A mixture of 5 parts of concentrated aqueous hydrochloric acid, 10 parts of iron powder and 250 parts of water is heated and stirred at 95–100° C. during 30 minutes. 10 parts of 4-n-butylamino-7-nitroquinazoline are then added during 1 hour at 95–100° C. and the mixture is then heated and stirred at 95–100° C. during a further 6 hours and is then filtered hot. The hot filtrate is adjusted to pH 8 by the addition of sodium carbonate and is then filtered. The filtrate is basified with 20 parts of 40% aqueous sodium hydroxide solution and the mixture so obtained is extracted with 280 parts of ether at 30° C. The ethereal extract is dried and concentrated to about 150 parts and then cooled and filtered. 7-amino-4-n-butylaminoquinazoline is obtained as a colourless crystalline solid, M. P. 150–152° C.

The 4-n-butylamino-7-nitroquinazoline used as starting material may be obtained by adding 20 parts of 4-chloro-7-nitroquinazoline gradually, with stirring, to 38 parts of n-butylamine at 20° C. The mixture is then kept at 80° C. during 15 minutes, and is then cooled and poured into 2,000 parts of cold water and filtered. The solid residue is washed with cold water and is then added to a mixture of 950 parts of water and 45 parts of concentrated aqueous hydrochloric acid and filtered. The filtrate is basified with concentrated aqueous ammonium hydroxide and there is obtained 4-n-butylamino-7-nitroquinazoline, M. P. 142–144° C.

*Example 8*

A mixture of 1.1 parts of 7-amino-4-n-butylaminoquinazoline (obtained as described in Example 7), 10.5 parts of glacial acetic acid and 0.65 part of acetic anhydride is heated to the boil. The mixture is then allowed to cool to 20° C. and is then poured into 100 parts of cold water and basified with concentrated aqueous ammonium hydroxide and filtered. The solid residue is washed with cold water and is then crystallised from aqueous ethanol and there is obtained 7-acetamido-4-n-butylaminoquinazoline, M. P. 303–304° C. (decomposition).

*Example 9*

A mixture of 10 parts of iron powder, 5 parts of concentrated aqueous hydrochloric acid and 100 parts of water is stirred and heated at 95–100° C. until no longer acid to Congo red. 5 parts of 4-amino-8-nitroquinazoline are then added and the mixture is then heated and stirred at 95–100° C., during 6 hours, and filtered. The filtrate is basified by addition of concentrated aqueous ammonium hydroxide and filtered and the solid residue is extracted with 100 parts of ethanol. The ethanolic extract is concentrated to about 20 parts and cooled and filtered. The solid residue is crystallised from water and there is obtained 4:8-diaminoquinazoline as a colourless crystalline solid, M. P. 210–212° C. The 4-amino-8-nitroquinazoline used as starting material may be obtained by adding 11.3 parts of 4-chloro-8-nitroquinazoline gradually during 10 minutes, to a stirred mixture of 50 parts of phenol and 25 parts of ammonium carbonate at 90–95° C. The mixture is stirred at 90–95° C. during 1 hour, maintaining alkalinity to Brilliant Yellow, if necessary, by the addition of ammonium carbonate. The mixture is then cooled and poured into 1,000 parts of cold water and 40% aqueous sodium hydroxide is added until the mixture is alkaline to Clayton Yellow. The mixture is filtered, the solid residue is washed with cold water and dried and is then added with stirring during 10 minutes to 100 parts of ammonium acetate at 140–150° C. The mixture is kept at 140–150° C. during 30 minutes and is then cooled and diluted with 150 parts of water and filtered. The solid residue is washed with cold water and is then added to a mixture of 5 parts of concentrated aqueous hydrochloric acid and 100 parts of water at 95° C. and filtered. The filtrate is basified with concentrated aqueous ammonium hydroxide and filtered and the solid residue is washed with cold water and crystallised from water. 4-amino-8-nitroquinazoline is so obtained as a yellow crystalline solid M. P. 284–286° C. (decomposition).

*Example 10*

10 parts of stannous chloride are added with stirring to a suspension of 2 parts of 4-amino-6-chloro-8-nitroquinazoline in 60 parts of concentrated aqueous hydrochloric acid at 20° C. The mixture is then heated under reflux for 3 minutes, cooled and basified by the addition of 40% aqueous sodium hydroxide until it is alkaline to Clayton Yellow and is then filtered. The solid residue is washed with two portions, each of 50 parts, of cold water and is then added to 40 parts of ethanol and filtered. The filtrate is evaporated and there is obtained 6-chloro-4,8-diaminoquinazoline as a crystalline solid, M. P. 258–259° C.

The 4-amino-6-chloro-8-nitroquinazoline used as starting material may be prepared as follows:

A mixture of 10 parts of 3-nitro-5-chloroanthranilic acid and 22.5 parts of formamide is heated at 155–160° C. during 12 hours. The mixture is cooled and extracted with two portions each of 200 parts of 5% aqueous bicarbonate. The solid residue is washed with cold water and dried and crystallised from nitrobenzene to give 6-chloro-4-hydroxy-8-nitroqinazoline as a yellow crystalline solid, M. P. 245–246° C.

A mixture of 3.1 parts of 6-chloro-4-hydroxy-8-nitroquinazoline, 3 parts of phosphorus pentachloride and 42 parts of phosphorus oxychloride is heated under reflux for 1 hour. The solution is then cooled, 80 parts of petroleum ether (40–60° C.) are added and the mixture is filtered. The solid residue is washed with petroleum ether (B. P. 40–60° C.) and there is obtained 4,6-dichloro-8-nitroquinazoline, M. P. 152–153° C.

25.2 parts of 4,6-dichloro-8-nitroquinazoline are added during 30 minutes to a stirred mixture of 200 parts of phenol and 100 parts of ammonium carbonate at 90–95° C. The mixture is heated at 90–95° C. during a further hour and is then cooled and poured into 2,000 parts of cold water. The mixture is basified with 40% aqueous sodium hydroxide until it is alkaline to Clayton Yellow and is then filtered. The solid residue is washed with cold water and dried and the 6-chloro-8-nitro-4-phenoxyquinazoline so obtained, M. P. 300–302° C., is added during 5 minutes to 200 parts of ammonium acetate at 140–150° C. The mixture is heated at 140–150° C. during 1 hour and is then cooled and poured into 500 parts of cold water and filtered.

The solid residue is washed with cold water and is then added to a mixture of 24 parts of concentrated aqueous hydrochloric acid and 280 parts of water at 95–100° C. and filtered. The filtrate is basified with concentrated aqueous ammonium hydroxide and there is obtained 4-amino-6-chloro-8-nitroquinazoline, M. P. 284–285° C.

What we claim is:

1. Quinazoline derivatives of the formula

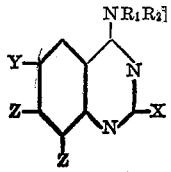

wherein $R_1$ and $R_2$ are selected from the group consisting of hydrogen and lower alkyl radicals and X is selected from the group consisting of hydrogen and methyl, Y is selected from the group consisting of hydrogen, chlorine and methyl, one of the Z substituents stands for hydrogen and the other Z substituent stands for the group $NHR_3$ wherein $R_3$ is selected from the group consisting of hydrogen and acyl radicals derived from lower aliphatic carboxylic acids.

2. 4,7-diaminoquinazoline.
3. 4-amino-7-acetamidoquinazoline.
4. 4-methylamino-7-aminoquinazoline.
5. 4-dimethylamino-7-aminoquinazoline.
6. 4,8-diaminoquinazoline.
7. Process for the manufacture of quinazoline derivatives of the formula:

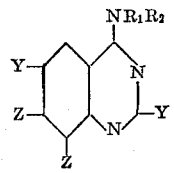

wherein $R_1$ and $R_2$ are selected from the group consisting of hydrogen and lower alkyl radicals and X is selected from the group consisting of hydrogen and methyl, Y is selected from the group consisting of hydrogen, chlorine and methyl, one of the Z substituents stands for hydrogen and the other Z substituent stands for the group $NHR_3$ wherein $R_3$ is selected from the group consisting of hydrogen and acyl radicals derived from lower aliphatic carboxylic acids which comprises reducing a compound of the formula:

wherein $R_1$, $R_2$, X and Y have the meaning stated above, one of the $Z'$ substituents stands for hydrogen and the other $Z'$ substituent stands for a nitro group.

8. Process as claimed in claim 7 wherein the reduced product is subsequently acylated.

9. Process as claimed in claim 7 wherein said compound is reduced with a member of the group consisting of stannous chloride and metallic powder in an aqueous acid medium.

10. Process as claimed in claim 9 wherein the metallic powder is iron powder.

11. Process as claimed in claim 9 wherein the aqueous acid medium is aqueous hydrochloric acid.

References Cited in the file of this patent

FOREIGN PATENTS 133,192    Switzerland ------------ Aug. 1, 1929